US012579611B2

(12) United States Patent
Pawanekar

(10) Patent No.:  US 12,579,611 B2
(45) Date of Patent:  Mar. 17, 2026

(54) METHOD AND SYSTEM FOR IMAGE PROCESSING THROUGH AN ARTIFICIAL NEURAL NETWORK IMPLEMENTED IN AN ADAPTER CARD IN A HOST-COMPUTING SYSTEM

(71) Applicant: US TECHNOLOGY INTERNATIONAL PRIVATE LIMITED, Kerala (IN)

(72) Inventor: Sameer Sadashiv Pawanekar, Indore (IN)

(73) Assignee: US TECHNOLOGY INTERNATIONAL PRIVATE LIMITED, Kerala (IN)

( * ) Notice: Subject to any disclaimer, the term of this patent is extended or adjusted under 35 U.S.C. 154(b) by 377 days.

(21) Appl. No.: 18/029,508

(22) PCT Filed: Apr. 13, 2021

(86) PCT No.: PCT/IN2021/050363
§ 371 (c)(1),
(2) Date: Mar. 30, 2023

(87) PCT Pub. No.: WO2022/070204
PCT Pub. Date: Apr. 7, 2022

(65) Prior Publication Data
US 2023/0351564 A1      Nov. 2, 2023

(30) Foreign Application Priority Data
Sep. 30, 2020    (IN) .............................. 202041042592

(51) Int. Cl.
*G06T 5/20*          (2006.01)
*G06V 10/44*         (2022.01)
(Continued)

(52) U.S. Cl.
CPC ................ *G06T 5/20* (2013.01); *G06V 10/44* (2022.01); *G06V 10/771* (2022.01); *G06V 20/70* (2022.01); *G06T 2207/20084* (2013.01)

(58) Field of Classification Search
CPC . G06T 5/20; G06T 2207/20084; G06V 10/44; G06V 10/771; G06V 20/70; G06V 10/82; G06N 3/045; G06N 3/08
See application file for complete search history.

(56) References Cited

U.S. PATENT DOCUMENTS 9,722,866 B1 *  8/2017  Brooker ................ G06F 11/004
10,164,639 B1 *  12/2018  Roberts ................. G06F 9/5077
(Continued)

FOREIGN PATENT DOCUMENTS

CN        111415003 A       7/2020

OTHER PUBLICATIONS

M. Sankaradas et al., "A Massively Parallel Coprocessor for Convolutional Neural Networks," 2009 20th IEEE International Conference on Application-specific Systems, Architectures and Processors, Boston, MA, USA, 2009, pp. 53-60, doi: 10.1109/ASAP.2009. 25. (Year: 2009).*

(Continued)

*Primary Examiner* — Andrae S Allison
(74) *Attorney, Agent, or Firm* — CANTOR COLBURN LLP

(57)          ABSTRACT

The present subject matter refers a method of image processing through an artificial neural network implemented in an adapter card in a host-computing system. The method comprises receiving image data from a host processor into a first fragment of first partition of a memory and simultaneously subjecting the captured features of the image data to a convolution procedure within a second fragment of the first partition through multi-core processing; receiving filter- (Continued)

weights from an on-board random access memory (RAM) into a first fragment of second partition of the memory via a storage controller and simultaneously subjecting the received filter weights to said convolution procure through a second fragment of the second partition through multi-core processing; receiving processing instruction from host into a first fragment of a third partition of the memory and simultaneously subjecting the received instructions to assist said convolution procure through a second fragment of the third partition through multi-core processing; generating an image feature map based on said convolution procedure to cause labelling of the received image data; and storing the labelled images into a first fragment of a fourth partition of the memory and simultaneously transferring the labelled images through a second fragment of the fourth partition back to the host.

12 Claims, 6 Drawing Sheets

(51) Int. Cl.
G06V 10/771 (2022.01)
G06V 20/70 (2022.01)

(56) References Cited

U.S. PATENT DOCUMENTS

| | | | | |
|---|---|---|---|---|
| 10,241,837 B2 * | 3/2019 | Huang | | G06N 3/063 |
| 10,776,699 B2 * | 9/2020 | Das | | G06N 3/044 |
| 10,802,992 B2 * | 10/2020 | Yu | | G06F 13/102 |
| 10,846,591 B2 * | 11/2020 | Lavigueur | | G06N 3/063 |
| 12,333,405 B2 * | 6/2025 | Mody | | G06N 3/04 |
| 2009/0202149 A1 | 8/2009 | Poi et al. | | |
| 2013/0332676 A1 * | 12/2013 | Kotla | | G06F 9/5061 |
| | | | | 711/129 |
| 2015/0092476 A1 * | 4/2015 | Lin | | G11C 8/16 |
| | | | | 365/189.16 |
| 2018/0173571 A1 * | 6/2018 | Huang | | G06F 9/5044 |
| 2019/0286973 A1 * | 9/2019 | Kovvuri | | G06N 3/04 |

OTHER PUBLICATIONS

Shawahna, Ahmad, Sadiq M. Sait, and Aiman El-Maleh. "FPGA-based accelerators of deep learning networks for learning and classification: A review." ieee Access 7 (2018): 7823-7859. (Year: 2018).*

Conti, Francesco. "Heterogeneous architectures for parallel acceleration." (2016), https://amsdottorato.unibo.it/id/eprint/7406/1/phd_thesis_AMS_wFRONTESPIZIO.pdf (Year: 2016).*

Cadambi, Srihari, et al. "A programmable parallel accelerator for learning and classification." Proceedings of the 19th international conference on Parallel architectures and compilation techniques. 2010. (Year: 2010).*

International Search Report mailed Jul. 30, 2021; International Application No. PCT/IN2021/050363; International Filing Date Apr. 13, 2021 (3 pgs).

Written Opinion mailed Jul. 30, 2021; International Application No. PCT/IN2021/050363; International Filing Date Apr. 13, 2021 (7 pgs).

* cited by examiner

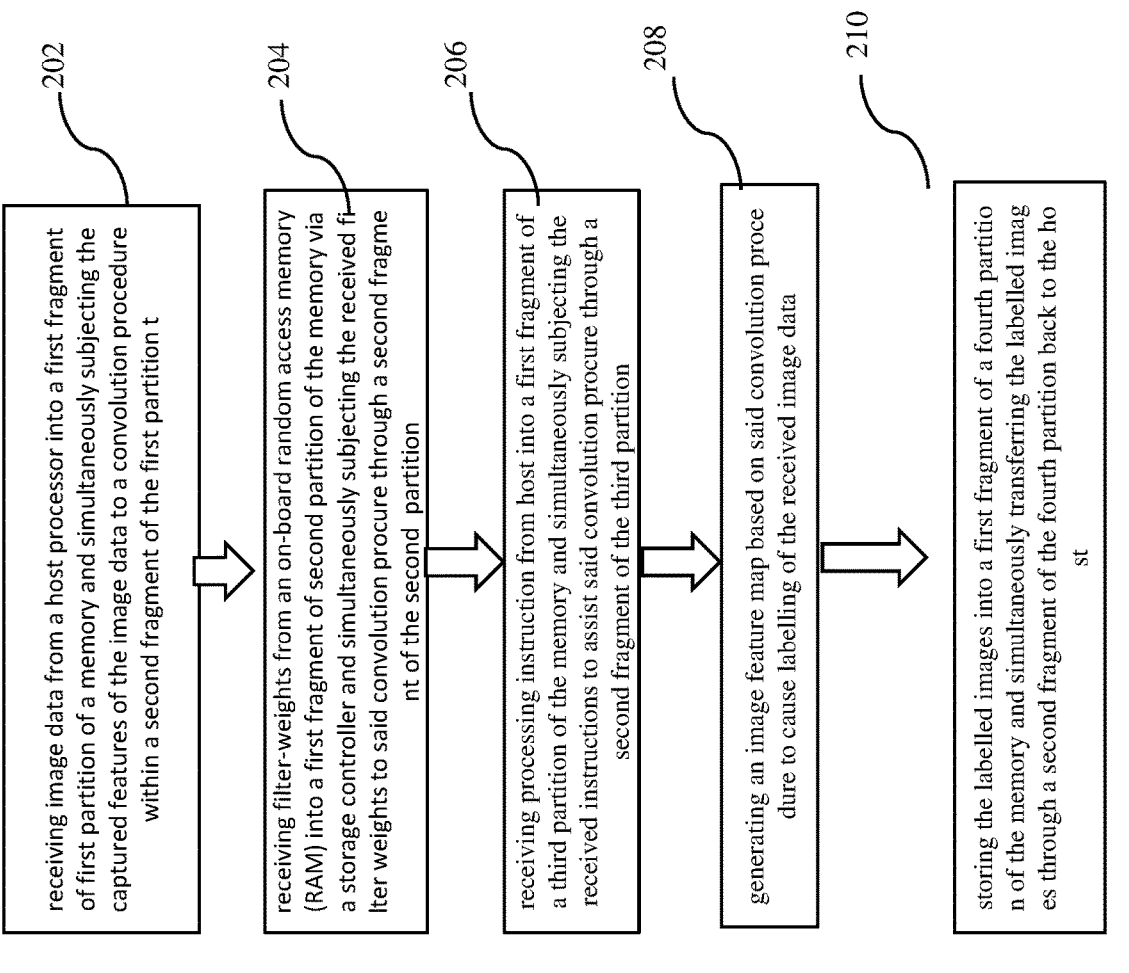

202 — receiving image data from a host processor into a first fragment of first partition of a memory and simultaneously subjecting the captured features of the image data to a convolution procedure within a second fragment of the first partition t 204 — receiving filter-weights from an on-board random access memory (RAM) into a first fragment of second partition of the memory via a storage controller and simultaneously subjecting the received filter weights to said convolution procure through a second fragment of the second partition 206 — receiving processing instruction from host into a first fragment of a third partition of the memory and simultaneously subjecting the received instructions to assist said convolution procure through a second fragment of the third partition 208 — generating an image feature map based on said convolution procedure to cause labelling of the received image data 210 — storing the labelled images into a first fragment of a fourth partition of the memory and simultaneously transferring the labelled images through a second fragment of the fourth partition back to the host

METHOD AND SYSTEM FOR IMAGE PROCESSING THROUGH AN ARTIFICIAL NEURAL NETWORK IMPLEMENTED IN AN ADAPTER CARD IN A HOST-COMPUTING SYSTEM

CROSS-REFERENCE TO RELATED APPLICATIONS

This Application is a U.S. National Stage Application of PCT/IN2021/050363, filed Apr. 13, 2021, which claims the benefit of India application No. 202041042592 filed, Sep. 30, 2020, both of which are incorporated by reference in their entirety.

FIELD OF THE INVENTION

The present invention relates to computing-device based inspection-systems and in-particular to computer-vision based systems.

BACKGROUND OF THE INVENTION

Information technology revolution has opened a way of applying computer vision approaches and helping users in image identification. Image identification has gained much importance in many fields from space applications to household usage. AI techniques provide intelligent decision to identify images and provide information about its characteristics. AI system may perform a multi-image heterogeneous classification from a single image. It also encompasses an application, which brings together computer vision, artificial intelligence (both deep learning and traditional machine learning), image-processing and mobility.

At least a computational approach based on deep convolution neural networks using VGG16 architecture is conventionally employed for identifying images. The systems use machine learning approaches for identifying the images from its leaf characteristics such as size, shape and orientation.

State of the art machine learning consists of data augmentation, pre-processing, feature extraction, and classification phases. FIG. 1 shows the general steps applied in an image. Machine learning is used to identify image using, its colour and geometrical features.

As shown in FIG. 1, as a part of a state-of-the-art deep learning networks for image classification, example image pre-processing steps involve resizing of every image, conversion of RGB image to HSV image, and thereby creation of mask or region of interest.

As a part of features extraction, convolution neural networks (CNNs) are employed that are Multilayer neural networks where the layers are stacked. It consists of input layer output layer in between multiple hidden layers. The hidden layers are convolutional, pooling or fully connected. When the images pass through convolutional layers, the filters learn features from the image. This is a linear transformation. The output is a feature map. Then it passes through non-linear transformations like Relu. It replaces all negative pixel values in the feature map by zero. Thereafter, a pooling step reduces the dimensionality but retains the important information from the feature map. So the convolutional and pooling layers act as feature extraction layers.

As a part of image classification, fully connected (FC) layer is followed by final soft-max layer or sigmoid layer. In the fully connected layer, every neuron in the previous layer is connected to every neuron in the next layer. The FC Layer with softmax activation function use features from Convolution and Pooling layers and classify the input image into various classes based on the training dataset.

However, state of the art deep learning VGG16 neural network are usually limited at least in terms of processing of frames per second as a part of convolutions, pooling, and classification operations. In an example, state of the art networks end up exhibiting substantially low throughput of about 500 to 1000 fps.

At least a bottleneck towards achieving a high throughout towards in term of high frame per second is posed by an example state of art computing configuration as follows:

LPDDR throughput calculations
Controller Clock 800 MHz
Data bus width 256 bits
Max Burst length 7F, F is used
Assuming 30% efficiency, data rate=800*256*0.3 bps=61440 bps=7680 bytes per second or 7680/9=854 network kernels per second
Parameter memory consumption rate calculation
Parameter memory width=512 bits
Number of kernel at an address=512/(9×8)=7
64 kernels in parameter memory per processor core, gets emptied in 222×222×3×64=9462528 clocks
Rate of consumption=7*64/(9462528*10^(−9))=48416 bps At least a bottleneck towards achieving a high throughout towards in term of high frame per second is posed by another example state of art computing configuration as follows:

PCIe throughput calculations
1 GHz AXI clock towards DUT
Data width 256 bit
Assuming 30% efficiency, incoming image data rate=1000*256*0.3 bps=76800 bps=9600 bytes per second or 9600/(224×224×3×8)=0.0079 images per second
Data memory consumption rate calculation
Data memory width=512 bits
Memory required to store an image=224×224×3×8=1176 kb=147 kB
Image gets emptied in 222×222×3×64=9462528 clocks
Rate of consumption=7*64/(9462528*10^(−9))=48416 bps Accordingly, there lies at least a need for an architecture for deep learning acceleration using VGG16 neural network that can achieve a substantially high throughput (e.g. about 2000 frames per second).

SUMMARY OF THE INVENTION

This summary is provided to introduce a selection of concepts in a simplified format that are further described in the detailed description of the invention. This summary is not intended to identify key or essential inventive concepts of the claimed subject matter, nor is it intended for determining the scope of the claimed subject matter.

The present subject matter refers a method of image processing through an artificial neural network implemented in an adapter card in a host-computing system. The method comprises receiving image data from a host processor into a first fragment of first partition of a memory and simultaneously subjecting the captured features of the image data to a convolution procedure within a second fragment of the first partition through multi-core processing; receiving filter-weights from an on-board random access memory (RAM) into a first fragment of second partition of the memory via a storage controller and simultaneously subjecting the received filter weights to said convolution procure through a second fragment of the second partition through multi-core processing; receiving processing instruction from host into a first fragment of a third partition of the memory and simultaneously subjecting the received instructions to assist said convolution procure through a second fragment of the third partition through multi-core processing; generating an image feature map based on said convolution procedure to cause labelling of the received image data; and storing the labelled images into a first fragment of a fourth partition of the memory and simultaneously transferring the labelled images through a second fragment of the fourth partition back to the host.

To further clarify, advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF FIGURES

These and other features, aspects, and advantages of the present invention will become better understood when the following detailed description is read with reference to the accompanying drawings in which like characters represent like parts throughout the drawings, wherein:

FIG. 2 illustrates method, in accordance with the embodiment of the invention;

DETAILED DESCRIPTION

Figure 1:
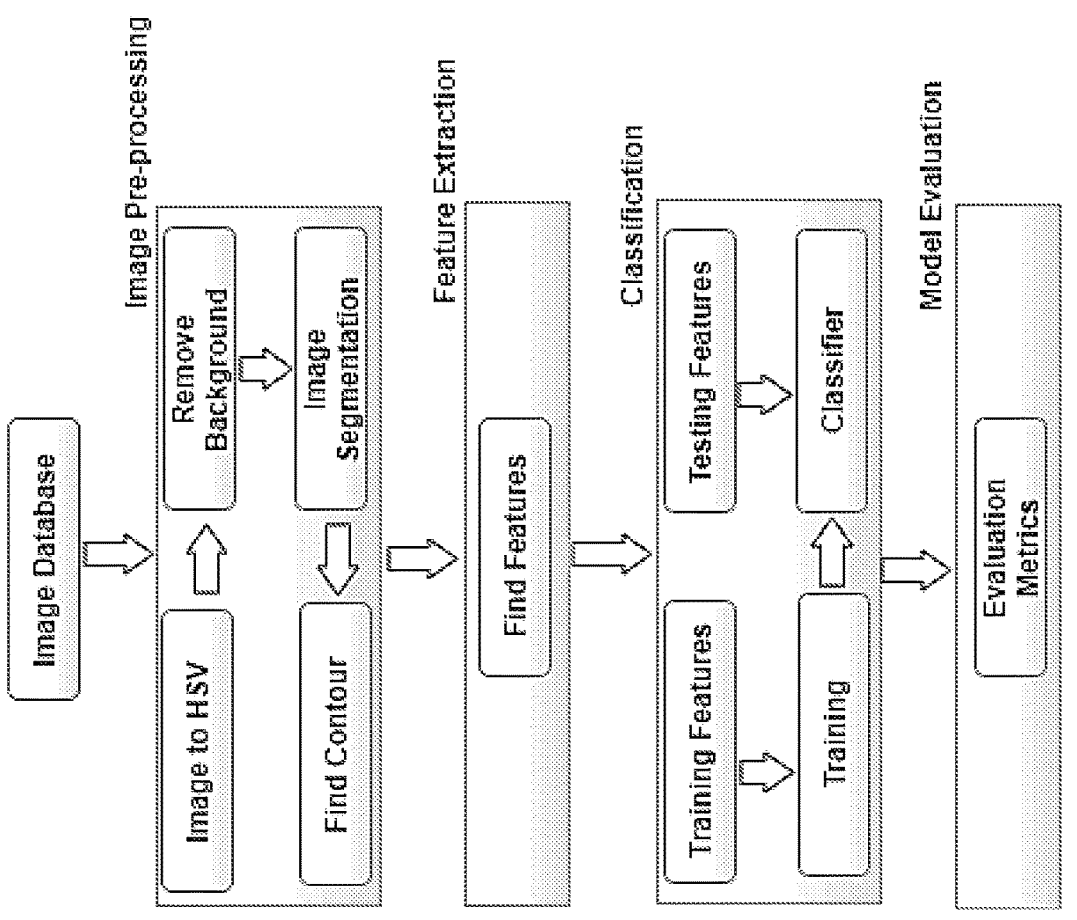
FIG. 1 illustrates state of the art method steps.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings.

Now referring to FIG. 2, the present subject matter illustrates a method of image processing through an artificial neural network implemented in an adapter card in a host-computing system.

The method comprises receiving (step 202) image data from a host processor into a first fragment of first partition of a memory and simultaneously subjecting the captured features of the image data to a convolution procedure within a second fragment of the first partition through multi-core processing. The receiving of the image data comprises receiving image data as a part of a DMA transfer at one half of an image memory from the host CPU, wherein the other half of the image memory executes calculation of the convolution procedure based on SOP.

The method further comprises receiving (step 204) filter-weights from an on-board random access memory (RAM) into a first fragment of second partition of the memory via a storage controller and simultaneously subjecting the received filter weights to said convolution procure through a second fragment of the second partition through multi-core processing. The receiving of the filter weights comprises receiving the filter weights at a weight memory from an on-board DDR weights block, wherein one half of weight memory receives weight as a part of DMA transfer and another half of the weight memory executes calculation of the convolution procedure based on SOP.

The method further comprises receiving (step 206) receiving processing instruction from host into a first fragment of a third partition of the memory and simultaneously subjecting the received instructions to assist said convolution procure through a second fragment of the third partition through multi-core processing. The filter-weights are received from the host CPU at a plurality of DDR memory blocks defining said on-board RAM. The multi-core processing may be defined by processing image data from the image memory and weights from the weights memory through a 64 processor cores.

Further, the first and second fragments for each partition operate based on operating the first fragment as a write-location for of images and/or weights and second fragment as a read-location for the images and/or weights during a first time instance. Thereafter, the first fragment and the second fragment are operated vice versa as the read location and the write location, respectively, during a second time instance when compared with the first time instance. Such second time instance is defined by a conclusion of a read operation from the second fragment based on exhaustion of images and/or weights to be read.

Alternatively, the first and second fragments in all the partitions interchange their role during the course of operation of the processor. During the first time slot, image/weights are brought to first fragment, whereas, the image/weights are being read from the second fragment. After some time duration, when all the image/weights of the second fragment are exhausted, the roles are reversed between the operation of first fragment and the second fragment. Image/weights are brought into the second fragment, and are read from the first fragment for processing.

In an example, the first and second fragments for each partition operate based on presence of a dual port memory defined by a first port for supporting a write operation for the write location and the second port for supporting a read operation for the read location.

The method further comprises generating (step 208) an image feature map based on said convolution procedure to cause labelling of the received image data. In an example, the feature map may be generated as a part of feature extraction stage of the deep learning network.

The method further comprises storing (210) the labelled images into a first fragment of a fourth partition of the memory and simultaneously transferring the labelled images through a second fragment of the fourth partition back to the host. The storage of the labelled images comprises receiving a calculated SOP result from a data path unit into a first half of an output memory and transferring the labelled images to the host comprises sending a final output labelled data from another half of the output memory.

Overall, the sum of product (SoP) is undertaken as the convolution operation, such as $Y=x1*a1+x2*a2+x3*a3 \ldots +x16*a16$; where $a1 \ldots a16$ are the filter weights and $x1 \ldots x16$ are the image values Accordingly, by virtue of aforesaid portioning and fragmentations, there is overlap of SoP operations and direct memory access (DMA) transfer in time to achieve higher throughput.

FIG. 3 illustrates an adapter card in a host-computing system 300 for implementing a method of image processing through an artificial neural network. The adapter card is implemented upon a PCB board connected through PCIe connector to a host computer 314. The same enables transfer of the images from host to the adapter card and vice versa through PCIe interface. The PCB board at least comprises a plurality of DDR memory blocks 316, a multi-core processor, wherein memory block of the processor core is fragmented memory. The adapter card comprises the plurality of on-board RAM memory blocks 316 and a plurality of storage controllers 318 for said blocks.

The RAM memory block 316 is implemented as a part of PCB, wherein said PCB houses an integrated circuit or SoC comprising the multi-core processing system, the plurality of storage controllers 318, and the memory 302, 304, 306, 308 defined by said plurality of fragments and partitions. Further, the filter weights are received at the plurality of DDR memory blocks 316 from a host CPU 314.

Since the weights are required frequently during computation of the sum of products, they are placed at the vicinity of the Data path unit for quick access. Accordingly, the weights are beforehand loaded in DDR memory present on-board from the host machine and expedite sum of products calculation through a data path unit.

Figure 3A:
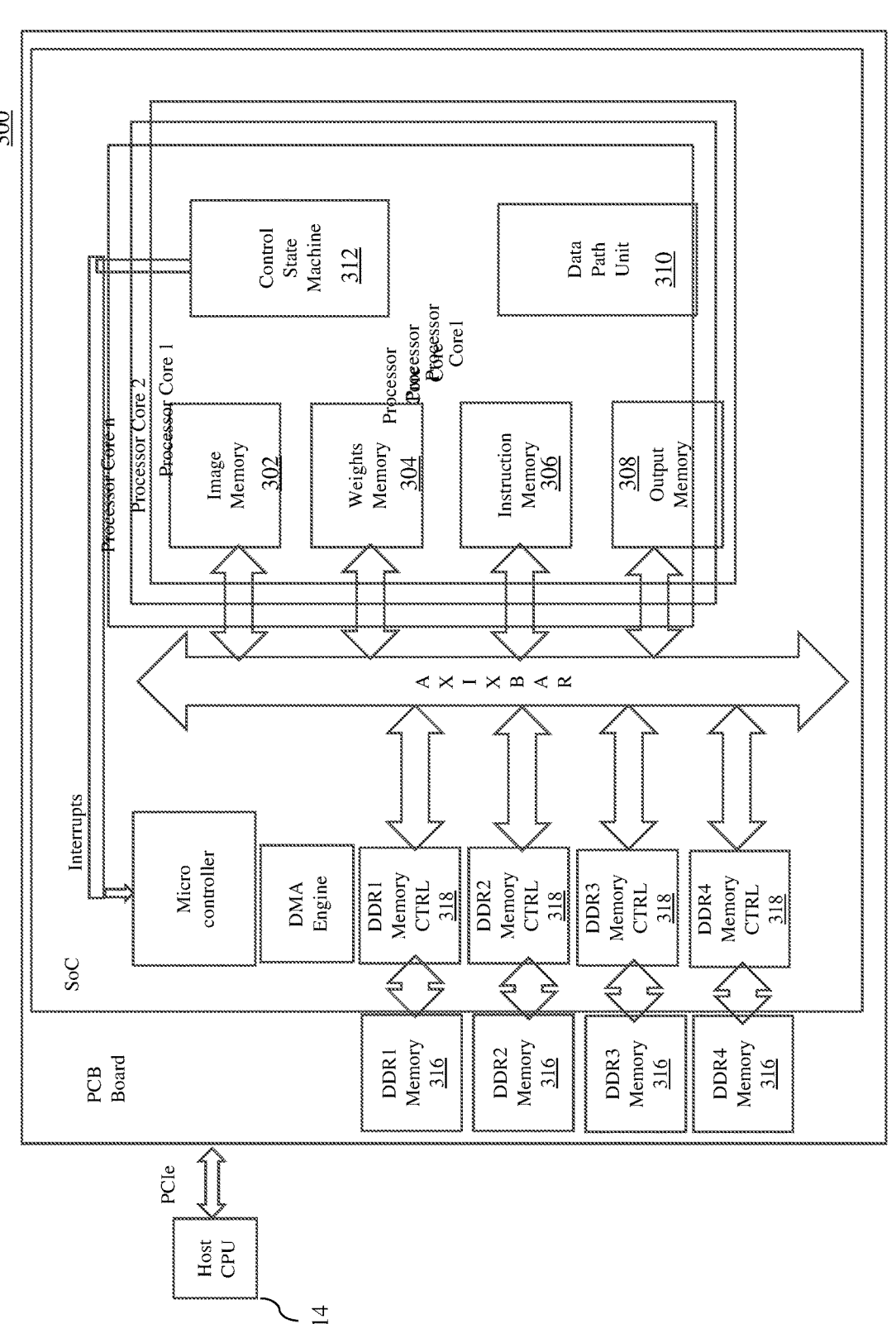
FIG. 3 illustrates a system architecture, in accordance with another embodiment of the invention.
Figure 3B:
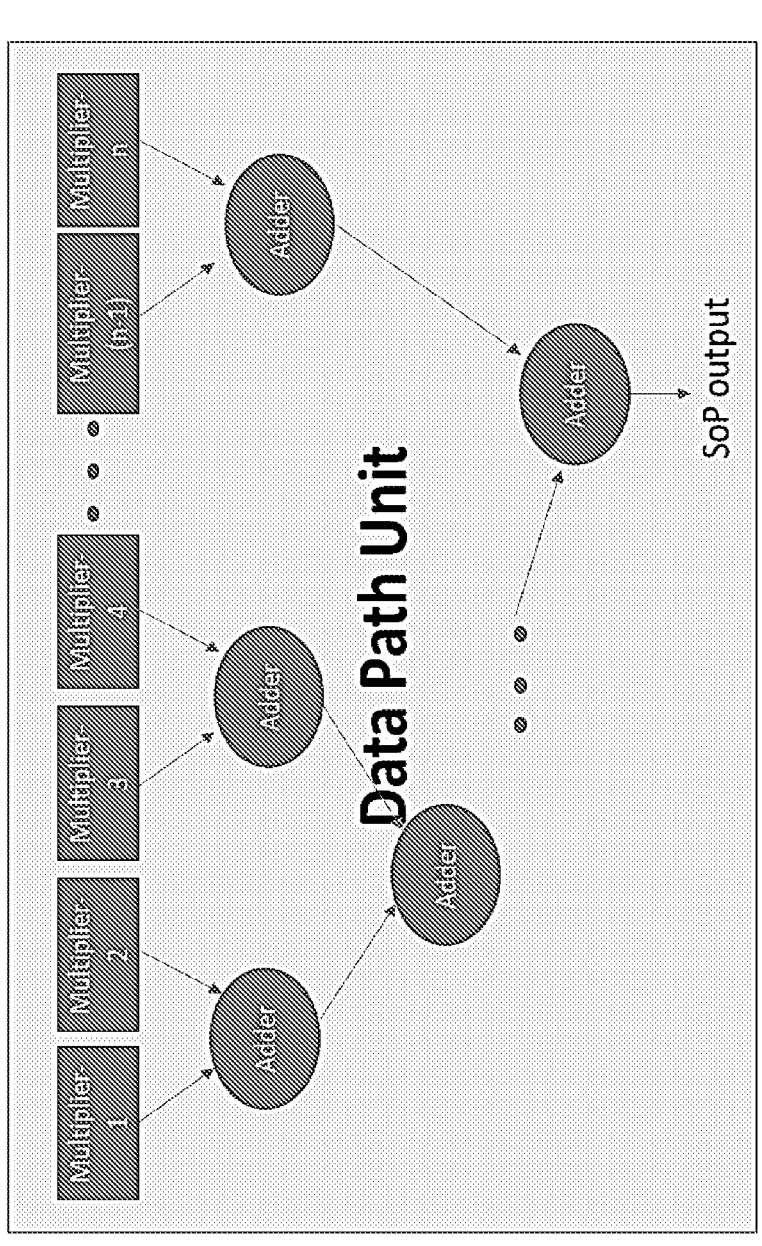

As shown in FIG. 3a, the architecture 300 comprises image memory 302 stores images, weights memory 304 stores filter weights, instruction memory 306 stores the instructions to be executed on processing core, and output memory 308 stores the outputs of sum of product instructions which are produced by Data path unit 310 as also shown in FIG. 3b. A controller state machine 312 operation is based on the set of instruction loaded into the instruction memory 306.

A first fragment of first partition of a memory 302 is configured for receiving image data from a host processor. A second fragment of the first partition of the memory 302 is configured for subjecting the captured features of the image data to a convolution procedure through said multi-core processing system.

A first fragment of a second partition of the memory 304 is configured for receiving filter-weights from an on-board random access memory (RAM) via a storage controller 310. A second fragment of the second partition of the memory 304 is configured for simultaneously subjecting the received filter weights to said convolution procure through multi-core processing.

A first fragment of a third partition of the memory 306 is configured for receiving processing instruction from the host. A second fragment of the third partition of the memory 306 is configured for simultaneously subjecting the received instructions to assist said convolution procure through multi-core processing.

Division of a memory block into two or more subsets, and resulting operation of the fragments is done in such a way that while one fragment is occupied in performing task A, other fragment is occupied in performing task B. At least due to this, a total time required for image classification is equal to the sum of the time required for a) fetch data (weights and images) from the DDR memory and host to local memory blocks as a part of DMA transfer and b) actual computation of sum of product operation. The computation of part b) is performed with ease of operation when part a) is hidden or overlapping or parallel with part b). In an example, part a) corresponds to a DMA transfer and part b) corresponds to SOP operation.

Further, a deep learning module may be configured for generating an image feature map based on said convolution procedure to cause classification of the received image data. a first fragment of a fourth partition of the memory 308 is configured for storing the labelled images. A second fragment of the fourth partition of the memory 308 is configured for simultaneously transferring the labelled images back to the host.

As aforementioned and as a part of partitioning, the total memory is partitioned into variety of blocks: a) image memory 302, b) weights memory 304, c) instruction memory 306, and d) output memory 308. The same renders a systematic approach for loading the variables involved in computation into and from memory. This exhaustively performs the storage (loading and unloading) of all possible variables involved in computations. The time required loading and unloading of the memory is then hidden by the fragmenting method with respect to each of the partition.

In an example, when a processor within the system 300 performs SOP by fetching the values of images and weights from the respective memory blocks, the Host CPU 314 fills the other fragments 302, 304, 306 and 308 of the respective memory blocks, using DMA, with corresponding values of weights and images which will be required in the future iteration. At least based on this, the time required to transfer data to the memory blocks is hidden behind the time required for computation by the processor. In other words, the transfer of data to the memory blocks occurs parallel with the computation done by the processor.

Figure 4:
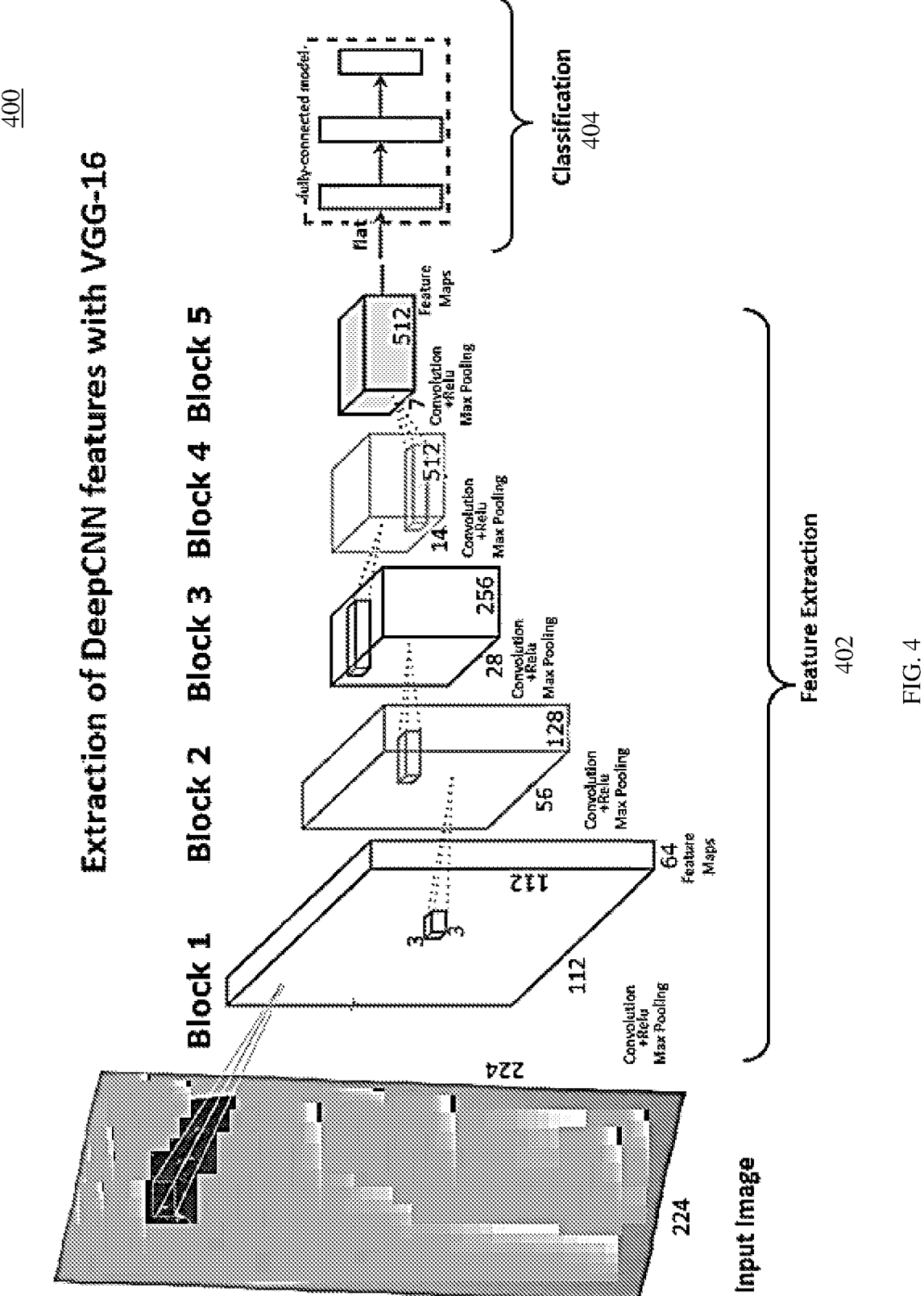
FIG. 4 illustrates an example flow forming a part of inference phase, in accordance with another embodiment of the invention.

Now referring to FIG. 4, an inference phase is illustrated in respect of the present subject matter. The steps precursor to the inference phase corresponds to image pre-processing steps.

In an example, during the training phase, data augmentation may be adopted. Programmatic data augmentation increases the size of input dataset. By applying transformations like rotations, horizontal flip, vertical flip operations were performed to increase number of original images to extended images. The increased number of images may be used for training and testing.

In an example, apart from VGG16—Convolutional Network for Classification and Detection, the AI model undergoing training may also be a combination of CNN Densenet, HMM, LSTM, recurrent neural network (RNN), restricted Boltzmann Machine (RBM), deep belief network (DBN), bidirectional recurrent deep neural network (BRDNN), generative adversarial networks (GAN), and deep Q-networks.

As a part of image pre-processing, RGB image maybe converted to HSV image. A mask or region of interest (ROI) of HSV image. Filter may be used to extract the object. Based on aforesaid, the image may be pre-processed to convert into a modified SEM image to thereby enable the capturing of substantially finer image-features.

As a part of inference phase, the trained machine-learning model developed with relevant features from the designed dataset. In an example, the trained model may be CNNs that are multilayer neural networks where the layers are stacked. It consists of input layer output layer and in between, multiple hidden layers. The hidden layers are convolutional, pooling or fully connected.

As a part of "feature extraction" 402 as depicted in FIG. 4, the pre-processed images pass through the filters to learn features from the image and derive values (e.g. through dimensionality reduction) for facilitating subsequent-learning and generalization. The output is a feature map. Thereafter, the pooling step reduces the dimensionality but retains the important information from the feature map. Accordingly, the convolutional and pooling layers' act as feature extraction layers. While the present stage 402 has been illustrated with respect to convolution-layers to extract features, the present stage 402 may be expanded to cover other general dimensionality reduction techniques such as Independent component analysis, Isomap, Kernel PCA, Latent semantic analysis, Partial least squares, Principal component analysis.

As a part of the "classifier operation" 404, a fully connected (FC) layer may be followed by a sigmoid layer. In the fully connected layer, every neuron in the previous layer is connected to every neuron in the next layer. The FC Layer with sigmoid activation function use features from Convolution and Pooling layers, and classifies the input image into multiple labels based on the training dataset.

As a computing architecture implementation for the VGG16 model, following may be example specifications:

1 GHz core clock
VGG16 Network
Data width=Int8
64 processor cores
16 SoPs per processor core
Data mem bus width 512
Param mem bus width 512
Full availability of feature and weights
All Weights availability in param mem
All Feature availability in data mem
Image size 224×224×3

Rate of SoP Output in an Processor Core
16 SoP units per processor core
int8
512 data width and param width
Filter dimension 3×3
Which means minimum 3 sops (512/(9×8))=7) outputs per clock per SoP unit
Total output per clock for an processor core=16×7=117 sops
Number of SOPs per second for the chip of 64 processor cores=117×64=7168

Figure 5:
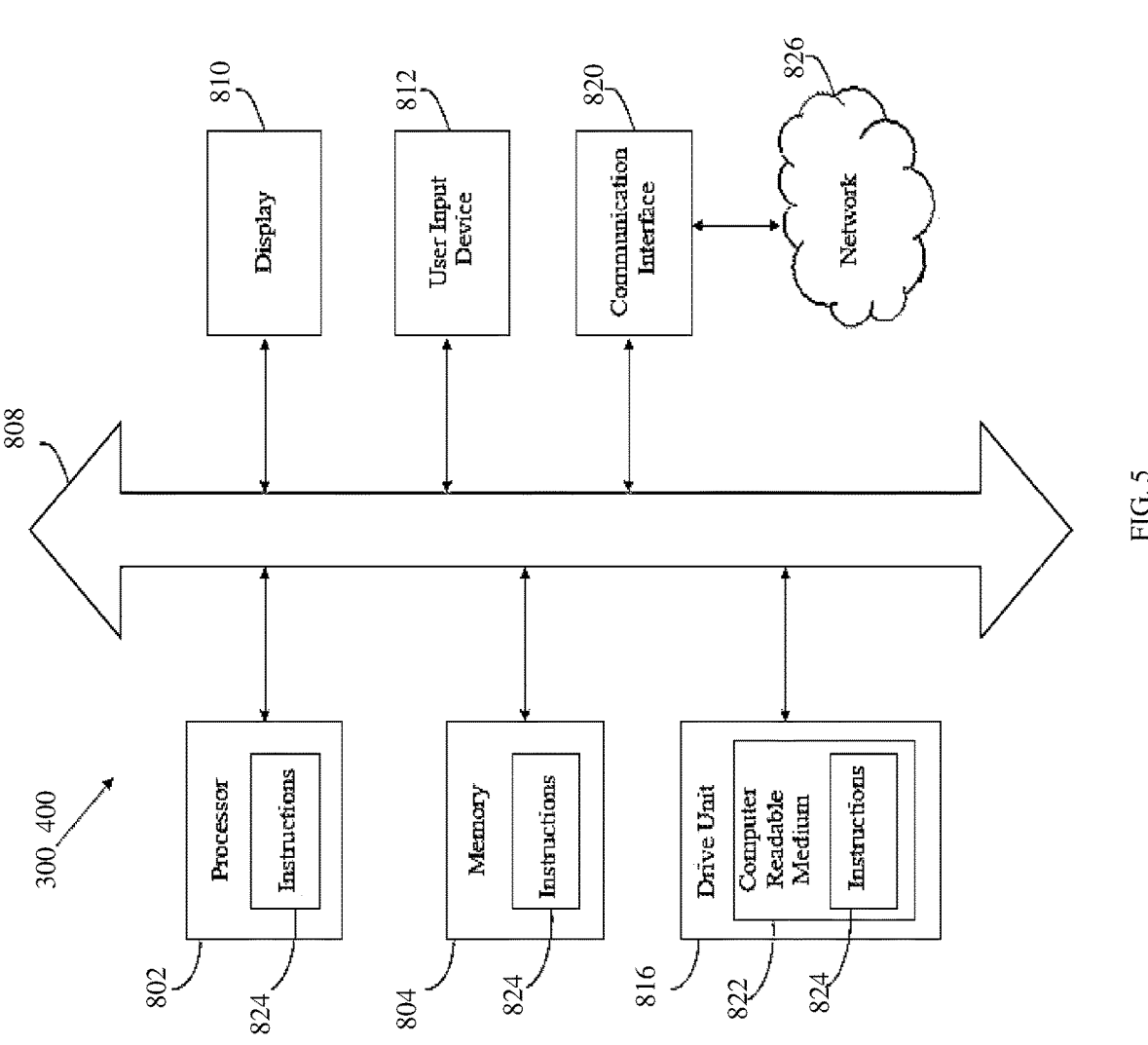
FIG. 5 illustrates an example VGG16 neural network, in accordance with the embodiment of the invention; and Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

Timing for VGG16 Layer 1
1st layer Convolution time calculations
64 weight filters
1 clock per sop with ignored initial latency of 5 clocks
1 clock for bias, ignored
1 clock for relu, ignored
Total clocks 1 per sop
Total clocks in conv1=64×(224×224×3)=9,633,792
Total clocks in conv2=4072×(224×224×3)=612,950,016
SoP unit time required=9,633,792+612,950,016=622,583,808 ns
Chip time required=622,583,808/(64×16)=607992 ns Timing for VGG16 Layer 2
2nd layer Convolution time calculations
64 weight filters
1 clock per sop with ignored initial latency of 5 clocks
1 clock for bias, ignored
1 clock for relu, ignored
Total clocks 1 per sop
Total clocks in conv1=128×(112×112×64)=102,760,448
Total clocks in conv2=128×(112×112×128)=205,520,896
SoP unit time required=102,760,448+205,520,896=308,281,344 ns
Chip time required=308,281,344/(64×16)=301,056 ns Timing for VGG16 Layer 3
3rd layer Convolution time calculations
64 weight filters
1 clock per sop with ignored initial latency of 5 clocks
1 clock for bias, ignored
1 clock for relu, ignored
Total clocks 1 per sop
Total clocks in conv1=64×(224×224×3)=9,633,792
Total clocks in conv2=4072×(224×224×3)=612,950,016
SoP unit time required=9,633,792+612,950,016=622,583,808 ns
Chip time required=622,583,808/(64×16)=607992 ns Overall Timing
1 clock for maxpool ignored
For 1 processor core Output volume received in 0.029 sec=34 frames per second
For 48 processor cores, we have 1655 frames per second
For 64 processor cores, we have 2206 frames per second FIG. 5 shows yet another exemplary implementation in accordance with the embodiment of the invention, and yet another typical hardware configuration of the system 300, 400 in the form of a computer-system 800. The computer system 800 can include a set of instructions that can be executed to cause the computer system 800 to perform any one or more of the methods disclosed. The computer system 800 may operate as a standalone-device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802 e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analysing and processing data. The processor 802 may implement a software program, such as code generated manually (i.e., programmed).

The computer system 800 may include a memory 804, such as a memory 804 that can communicate via a bus 808. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 804 includes a cache or random access memory for the processor 802. In alternative examples, the memory 804 is separate from the processor 802, such as a cache memory of a processor, the system memory, or other memory. The memory 804 may be an external storage device or database for storing data. The memory 804 is operable to store instructions executable by the processor 802. The functions, acts or tasks illustrated in the figures or described may be performed by the programmed processor 802 for executing the instructions stored in the memory 804. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 800 may or may not further include a display unit 810, such as a liquid crystal display (LCD), an organic light emitting diode (OLED), a flat panel display, a solid state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 1016.

Additionally, the computer system 800 may include an input device 812 configured to allow a user to interact with any of the components of system 800. The computer system 800 may also include a disk or optical drive unit 816. The disk drive unit 816 may include a computer-readable medium 822 in which one or more sets of instructions 824, e.g. software, can be embedded. Further, the instructions 824 may embody one or more of the methods or logic as described. In a particular example, the instructions 824 may reside completely, or at least partially, within the memory 804 or within the processor 802 during execution by the computer system 800.

The present invention contemplates a computer-readable medium that includes instructions 824 or receives and executes instructions 824 responsive to a propagated signal so that a device connected to a network 826 can communicate voice, video, audio, images or any other data over the network 826. Further, the instructions 824 may be transmitted or received over the network 826 via a communication port or interface 820 or using a bus 808. The communication port or interface 820 may be a part of the processor 802 or may be a separate component. The communication port 820 may be created in software or may be a physical connection in hardware. The communication port 820 may be configured to connect with a network 826, external media, the display 810, or any other components in system 800, or combinations thereof. The connection with the network 826 may be a physical connection, such as a wired Ethernet connection or may be established wirelessly as discussed later. Likewise, the additional connections with other components of the system 800 may be physical connections or may be established wirelessly. The network 826 may alternatively be directly connected to the bus 808.

The network 826 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

At least by virtue of aforesaid features, the present subject matter renders a feasibility to realize the VGG16 model on an FPGA board while achieving a high throughput of processing of about 2000 frames per second.

While specific language has been used to describe the disclosure, any limitations arising on account of the same are not intended. As would be apparent to a person in the art, various working modifications may be made to the method in order to implement the inventive concept as taught herein.

The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

I claim:

1. A method of image processing through an artificial neural network implemented in an adapter card in a host-computing system, the method comprising:

receiving image data from a host processor into a first fragment of a first partition of a memory and simultaneously subjecting captured features of the received image data to a convolution procedure within a second fragment of the first partition through multi-core processing;

receiving filter-weights from an on-board random access memory (RAM) into a first fragment of a second partition of the memory via a storage controller and simultaneously subjecting the received filter weights to the convolution procedure through a second fragment of the second partition through the multi-core processing;

receiving processing instructions from the host processor into a first fragment of a third partition of the memory and simultaneously subjecting the received processing instructions to assist the convolution procedure through a second fragment of the third partition through the multi-core processing;

generating an image feature map based on the convolution procedure to cause labelling of the received image data; and storing labelled images into a first fragment of a fourth partition of the memory and simultaneously transferring the labelled images through a second fragment of the fourth partition to the host processor.

2. The method of claim 1, comprising receiving the filter-weights from the host processor at a plurality of double data rate (DDR) memory blocks defining the on-board RAM.

3. The method of claim 1, wherein the receiving of the image data comprises receiving the image data as a part of a direct memory access (DMA) transfer at one half of an image memory from the host processor, wherein other half of the image memory executes calculation of the convolution procedure based on sum of product (SOP).

4. The method of claim 1, wherein the receiving of the filter-weights comprises receiving the filter-weights at a weight memory from an on-board DDR weights block, wherein one half of the weight memory receives the filter-weights as a part of a direct memory access (DMA) transfer and another other half of the weight memory executes calculation of the convolution procedure based on sum of product (SOP).

5. The method of claim 1, wherein the multi-core processing is defined by processing the image data from an image memory and the filter-weights from a weight memory through 64 processor cores.

6. The method of claim 1, wherein the storing of the labelled images comprises receiving a calculated sum of product (SOP) result from a data path unit into a first half of an output memory, and wherein the transferring of the labelled images to the host processor comprises sending final output labelled data from other half of the output memory.

7. The method of claim 1, wherein the first and second fragments for each partition of the memory operate by the steps of:

operating the first fragment as a write-location for images and/or weights and the second fragment as a read-location for the images and/or the weights during a first time instance;

operating the first fragment and the second fragment vice versa as the read-location and the write-location, respectively, during a second time instance when compared with the first time instance, wherein the second time instance is defined by a conclusion of a read operation from the second fragment based on exhaustion of images and/or weights to be read.

8. The method of claim 7, wherein the first and second fragments for each partition of the memory operate based on presence of a dual port memory defined by a first port for supporting a write operation for the write-location and a second port for supporting a read operation for the read-location.

9. An adapter card in a host-computing system for implementing a method of image processing through an artificial neural network, the adapter card comprising:

a multi-core processing system;

a first fragment of a first partition of a memory configured to receive image data from a host processor;

a second fragment of the first partition configured to simultaneously subject captured features of the received image data to a convolution procedure through the multi-core processing system;

a first fragment of a second partition of the memory configured to receive filter-weights from an on-board random access memory (RAM) via a storage controller;

a second fragment of the second partition configured to simultaneously subject the received filter weights to the convolution procedure through the multi-core processing system;

a first fragment of a third partition of the memory configured to receive processing instructions from the host processor;

a second fragment of the third partition configured to simultaneously subject the received processing instructions to assist the convolution through the multi-core processing system;

a deep learning module configured to generate an image feature map based on the convolution procedure to cause labelling of the received image data;

a first fragment of a fourth partition of the memory configured to store labelled images; and a second fragment of the fourth partition configured to simultaneously transfer the labelled images to the host processor.

10. The adapter card of claim 9, further comprising a plurality of on-board RAM memory blocks.

11. The adapter card of claim 10, further comprising a plurality of storage controllers for the plurality of on-board RAM memory blocks.

12. The adapter card of claim 11, wherein an on-board RAM memory block is implemented as a part of printed circuit board (PCB), wherein the PCB houses an integrated circuit (SoC) comprising the multi-core processing system, the plurality of storage controllers, and the memory defined by the fragments and the partitions.

\* \* \* \* \*